United States Patent Office 2,773,868
Patented Dec. 11, 1956

2,773,868

STEROID KETAL

Eugene J. Agnello and Gerald D. Laubach, Jackson Heights, N. Y., assignors to Chas. Pfizer & Co., Inc., Brooklyn, N. Y., a corporation of Delaware No Drawing. Application May 10, 1954,
Serial No. 428,824

1 Claim. (Cl. 260—239.55)

This invention relates to the preparation of steroid compounds which are useful intermediates in the synthesis of certain biologically active materials such as the cortical steroids. In particular this invention is concerned with novel derivatives of the 20-keto group of 7,8-nuclear unsaturated, 20-keto substituted steroids. This application is a continuation-in-part of application Serial Number 272,246, filed on February 18, 1952.

A number of biologically active steroid compounds are substituted at the 17-position with an hydroxylated carbon chain like

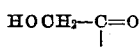

or an ester or ether thereof, and many steroids possess the grouping

at C17. If these and similar side chains are introduced at an early stage of the synthesis of a cortical steroid like cortisone, difficulties are encountered in preserving the keto group through the later series of reactions, and particularly during the necessary oxidation steps. At the same time, introduction of the 20-keto group in the final stages of cortisone synthesis is especially hampered because of the many complex changes which have meanwhile been effected in the steroid molecule.

Some times the desired 20-keto group can be added to the steroid and then preserved through later operations by some simple reactions which place it in a less readily attacked form, but a form which can easily be reconverted to a ketone at the chosen time. There is unfortunately, however, a type of steroid on which this method is unsuccessful; namely, a 7,8-nuclear unsaturated compound. The 7,8 double bond is desirable to retain in many steps of the cortical steroid synthesis, yet is particularly sensitive and reactive. Attempts to convert a 20-keto group to a more stable form may result in destroying or materially changing the 7,8-unsaturated position.

It is among the objects of this invention to obviate these and other difficulties in the field of cortisone synthesis. A particular object is to protect the 20-keto substituted group of a steroid from destruction without affecting a 7,8-double bond within the steroid nucleus. A further object is the recovery of novel derivatives of the 20-keto substituent of a 7,8-unsaturated, 20-keto steroid. Additional objects will be apparent from the ensuing discussion.

These objects are realized according to the present invention by converting a 7,8-unsaturated, 20-keto steroid to a 7,8-unsaturated steroid having as the C20 substituent a ketal or spiroketal group, or a sulfur analogue thereof, i. e. a group where one or both of the ketal oxygens is replaced by sulfur. The process whereby such novel ketone derivatives are prepared broadly comprises treating steroid under anhydrous conditions in the presence of an acidic condensing agent with an alkanol, glycol or mercaptan, and removing the water as it is formed during the reaction. As used herein, the term "mercaptan" is intended generically to include dimercaptans, substituted compounds like alkyl mercaptans, mercapto alkanols and the like, as well as mercaptans specifically.

The products of this invention are still unsaturated at the 7,8-position of the steroid nucleus, and subsequent steps in the synthesis of cortical steroids may be conducted in a normal manner. At the same time, the new 20-ketal, spiroketal or corresponding sulfur analogue is stabilized so that these later steps will not readily attack it. Among the reactions which may be conducted without damage to the protected group are oxidation of the steroid nucleus under anhydrous conditions, e. g. by the procedure disclosed in the copending application of Gerald D. Laubach, Serial No. 235,393 filed July 5, 1951; reduction of various groups of the nucleus, such as the method shown in another copending application of Gerald D. Laubach, Serial No. 222,947 filed April 25, 1951; the Wolff-Kishner reaction, and many others. The only ordinary reaction conditions which should be avoided are those in which aqueous acidic reagents are present, since the converted ketone may be attacked thereby. Once the required series of cortisone synthesis reactions has been completed, the ketone may readily be regenerated by simple hydrolysis of the ketal, spiroketal, or corresponding sulfur substituent, or by other usual means.

As previously indicated, the new invention is contemplated for use on those steroids having double bonds at the 7,8-position or at both C7,8- and 9(11), or at 7,8 and some other nuclear position or positions. Double bonds at 7,8 and 9(11) are particularly useful for the later introduction of substituents at C11, and compounds of the ergostane series are of special interest. The following formulae designate possible and often preferred types of reactions: (Nuclear unsaturations other than at 7,8 are not shown.)

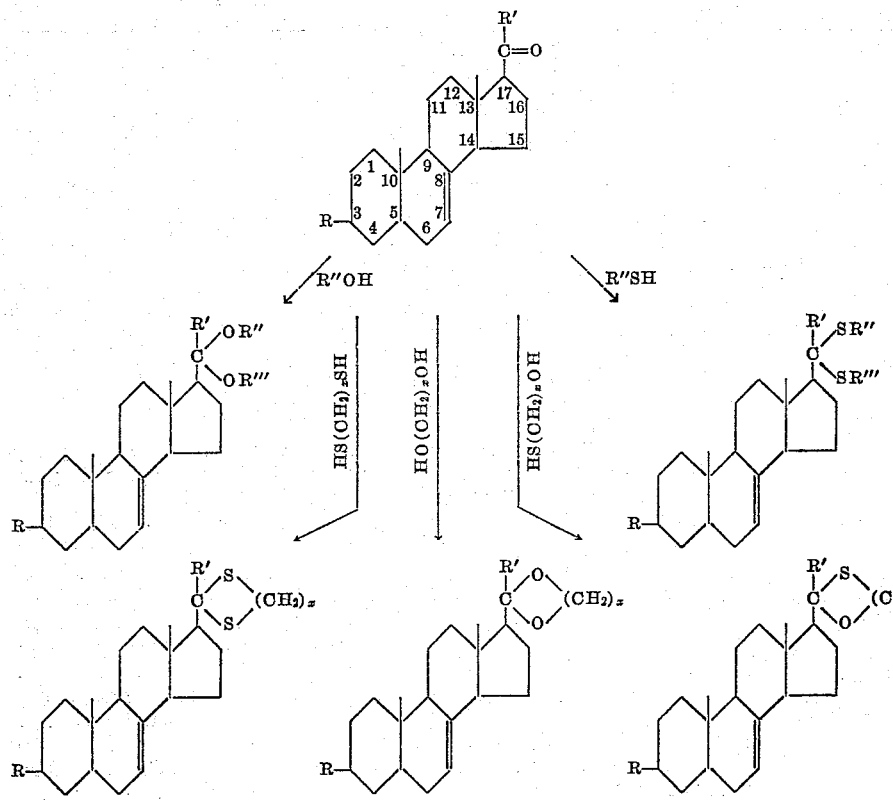

In the above formulae R is hydroxyl or a group readily hydrolyzable to hydroxyl (e. g. an ester or ether), R' is methyl or acyloxy methylene, R" and R'" are lower alkyl groups or part of a ring system, and $x$ is an integer, generally from 1 to 8. Thus, R" (becoming in part R'" in the product) may be alkyl or alkylene and connected to C20 as

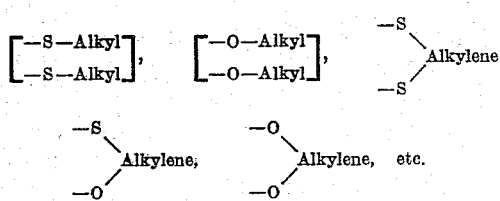

Among the alkanols, mercaptans and glycols which may be utilized as reagents for the preparation of the protected C20 keto steroids are ethyleneglycol, propyleneglycol, 1,2- or 1,3-butyleneglycol, methanol, ethanol, butanol, ethyl mercaptan, propyl mercaptan, ethane dithiol, β-thiolenthanol and so forth. It is best to use compounds with a limited number of carbon atoms, generally not greater than about eight. Obviously stoichiometric equivalents of the steroid and the hydroxylated or mercapto reactant are normally preferred, to provide most complete reaction without waste of either reagent. Formation of the keto-derivatives may readily be accomplished by dissolving the 20-keto steroid in the chosen glycol, alcohol, mercapto-alcohol, mercaptan, etc. and then adding a strong acid as the condensing agent, i. e. an acid ionizing at least as much as an acid having an ionization constant of about $1 \times 10^{-4}$. The strong acid is generally used in about one-twentieth a molecular proportion or more, based on the steroid, and it is preferred to have it anhydrous or nearly so, for instance hydrogen chloride, concentrated sulfuric acid, benzene sulfonic acid, toluene sulfonic acid, etc. Other acidic condensing agents, particularly those with dehydrating activity like anhydrous copper sulfate or anhydrous zinc chloride, may be employed. The procedure normally followed is to dissolve the steroid compound in the alcohol, mercaptan or the like before addition of the condensing acid. An inert organic solvent diluent may be used if desired. After the solution has been allowed to stand for several hours, it is neutralized by conventional methods. The salt thus obtained and any excess of the alkanol, glycol, or mercaptan reactant may then be removed. The reaction can be accelerated and forced to completion by heating, say to about the refluxing temperature of the system, and removing the water formed in the reaction. Removal of water is important also to avoid rearrangement of the double bond at the 7,8-position. If a solvent like benzene or toluene is used, the water may be eliminated by trapping the refluxing solvent, condensing and mechanically removing the separated water. The derivatives are readily obtained in crystalline form and in good yield.

Each of the novel products of this novel process is useful as an intermediate for the synthesis of valuable steroids, for example cortisone. Below is an outline of such a typical synthesis, taking the product of Example I, ethylene ketal of allo-7-pregnene-3β-ol-20-one-acetate, as the starting material.

A double bond is introduced at the 9(11) position by treatment with mercuric acetate according to the following equation.

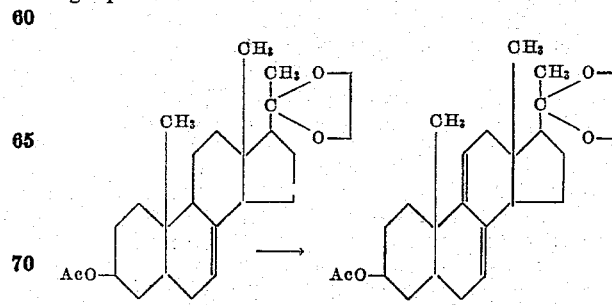

This reaction does not go in the absence of the double bond at the 7,8-position.

This product is then treated with perbenzoic acid to yield

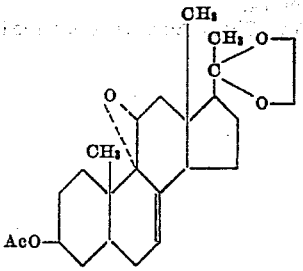

which is then reacted with boron trifluoride in ether to yield

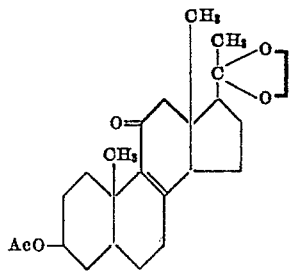

This compound is then subjected to the action of lithium in liquid ammonia to yield

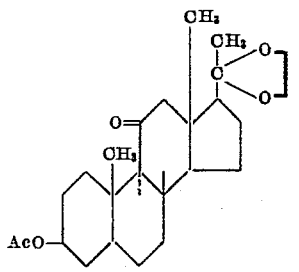

In each of these steps, especially the last one, the presence of the protecting group at the 20 position results in a considerable increase in the yield. Following these steps, the ketal group is readily removed by hydrolysis to yield

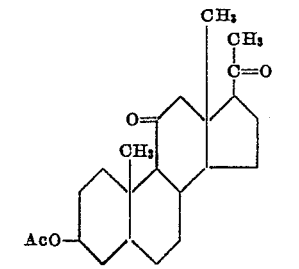

which is a well known intermediate for the synthesis of cortisone.

The following examples are given by way of illustration only and are not to be considered as the sole embodiments of this invention. It is to be understood that protection hereof is only limited by the specific wording of the appended claim.

EXAMPLE I

*Ethylene ketal of allo-7-pregnene-3β-ol-20-one acetate*

A solution of 1.5 g. of crude allo-7-pregnene-3β-ol-20-one acetate, 1.5 g. ethylene glycol, and 0.100 g. of toluene sulfonic acid in 50 ml. of benzene was refluxed for six hours. Throughout this period water was removed from the refluxing solvent by receiving the condensate in a water separator At the end of the treatment the amber mixture was diluted with 25 ml. of ether and extracted with water, saturated sodium bicarbonate solution and again water, so that it was at about neutrality. The extract was dried over sodium sulfate and concentrated under vacuum to a yellow solid. Trituration with 10 ml. of methanol afforded 1.0 g. (66%) of the desired product as a crisp white solid. Recrystallization from ethyl acetate-methanol resulted in a first crop of 0.450 g. of crystals, melting point 159.5–162.5° C., which showed only the 3-acetate carbonyl in the infrared absorption spectrum. Recrystallization for analysis resulted in no change in melting point, melting point 156.6–162.4° C. $[\alpha]_D^{25°} = -7°$ (C, 1.0% in chloroform).

*Analysis.*—Calcd. for $C_{25}H_{38}O_4$: C, 74.60; H, 9.52. Found: C, 74.96; H, 9.75.

EXAMPLE II

*Allo-7-pregnene-3β-ol-20-one acetate 20-ethylenehemithioketal*

A mixture of 1.32 g. of allo-7-pregnene-3β-ol-20-one acetate, 1.5 g. of β-mercaptoethanol, 0.11 g. of p-toluene sulfonic acid monohydrate and 55 ml. of benzene was heated under gentle reflux for three hours. Water was continuously separated from the refluxing benzene. After dilution with 50 ml. of benzene, the solution was washed twice with 20-ml. portions of water, twice with 20-ml. portions of 1% sodium bicarbonate solution and then with 20-ml. portions of water until the wash liquid was neutral. The benzene solution was dried and then evaporated to dryness in vacuo. Trituration of the solid product with 70% methanol yielded 1.29 g. of crude product. The infrared absorption spectrum did not show the maximum associated with a 20-keto compound. The 20-carbonyl group had reacted with the β-mercaptoethanol. After two recrystallizations from methanol-chloroform the pure product had a melting point of 180.6–182.4° C., $[\alpha]_D^{25} = -1.2°$ (in chloroform).

*Analysis.*—Calcd. for $C_{25}H_{38}O_3S$: C, 71.72; H, 9.15. Found: C, 71.61; H, 9.03.

EXAMPLE III

*Allo-7,9(11)-pregnadiene-3β-ol-20-one acetate 20-ethylenehemithioketal*

A mixture of 0.9 g. of allo-7,9(11)-pregnadiene-3β-ol-20-one acetate, 1.1 g. of β-mercaptoethanol, 0.1 g. of p-toluene sulfonic acid monohydrate, and 55 ml. of benzene was heated under reflux with the continuous separation of water from the refluxing solvent. Heating was continued for six hours. The product wan then isolated by the procedure described in the previous example. Trituration with 60% ethanol gave 0.4 g. of product. The infrared spectrum of this material showed none of the 20-ketone absorption maximum which was present in the spectrum of the starting material. One recrystallization from methanol-chloroform gave a product melting at 120–124° C.

EXAMPLE IV

Each of the above 3 examples was repeated, but instead of the acetate present at the 3-position in those examples, a wide variety of other esters and ethers were used. Used groups included, for example, formate, propionate, benzoate and trimethylacetate among the esters, and methyl, ethyl and benzyl among the ethers, or in general, ester and ether groups containing from one to ten carbon atoms. In all cases the reactions proceeded as described above.

What is claimed is:

The 20-ethylene ketal of allo-7-pregnene-3β-ol-20-one acetate.

References Cited in the file of this patent

UNITED STATES PATENTS

| | | |
|---|---|---|
| 2,598,653 | Wettstein | May 27, 1952 |
| 2,598,654 | Wettstein | May 27, 1952 |

(Other references on following page)

UNITED STATES PATENTS

| | | |
|---|---|---|
| 2,648,662 | Julian | Aug. 11, 1953 |
| 2,648,663 | Julian | Aug. 11, 1953 |
| 2,671,095 | Levin | Mar. 2, 1954 |

FOREIGN PATENTS

| | | |
|---|---|---|
| 498,383 | Canada | Dec. 15, 1953 |

OTHER REFERENCES

Antonucci: J. Org. Chem., vol. 17, No. 10, October 1952, pp. 1369–74.

Romo: J. Am. Chem. Soc., October 1951, pp. 4961–64.